United States Patent [19]

Lauritsen et al.

[11] Patent Number: 5,570,025
[45] Date of Patent: Oct. 29, 1996

[54] ANNUNCIATOR AND BATTERY SUPPLY MEASUREMENT SYSTEM FOR CELLULAR TELEPHONES

[76] Inventors: Dan D. Lauritsen, 3905 NE. 42nd St., Vancouver, Wash. 98661; Galen Seitz, 5120 SW. Scholls Ferry Rd., Portland, Oreg. 97225

[21] Appl. No.: 340,832

[22] Filed: Nov. 16, 1994

[51] Int. Cl.⁶ .............................. G01N 27/416; H04B 1/16
[52] U.S. Cl. ............................. 324/433; 455/343; 320/48
[58] Field of Search ................................... 324/429, 435, 324/433; 340/636; 320/48; 455/343, 383

[56] References Cited

U.S. PATENT DOCUMENTS

| | | | |
|---|---|---|---|
| 4,086,525 | 4/1978 | Ibsen | 320/48 |
| 4,876,513 | 10/1989 | Brilmyer et al. | 320/48 |
| 4,914,393 | 4/1990 | Yoshida | 320/48 |
| 5,003,576 | 3/1991 | Heiferich | 379/88 |
| 5,027,294 | 6/1991 | Fakruddin | 324/429 |
| 5,122,751 | 6/1992 | Aita et al. | 324/433 |
| 5,166,623 | 11/1992 | Ganio | 324/433 |
| 5,239,286 | 8/1993 | Komatsuda | 320/48 |
| 5,327,486 | 7/1994 | Wolff et al. | 379/96 |
| 5,333,176 | 7/1994 | Burke et al. | 379/58 |
| 5,365,453 | 11/1994 | Startup et al. | 340/636 |
| 5,370,668 | 12/1994 | Shelton et al. | 607/29 |
| 5,424,722 | 6/1995 | Inada et al. | 320/48 |
| 5,451,881 | 9/1993 | Finger | 324/433 |

FOREIGN PATENT DOCUMENTS

404110785  4/1992  Japan .................................. 324/435

Primary Examiner—Maura K. Regan
Attorney, Agent, or Firm—Marger, Johnson, McCollom & Stolowitz, PC

[57] ABSTRACT

A cellular phone both annunciates and retrieves stored mail messages using a single keypad button. A cellular basestation transmits voice mail messages to the cellular phone indicating that voice mail is ready for retrieval. A light emitting diode (LED) is located underneath a translucent button on the phone keypad and is activated when the voice mail message is received by the cellular phone. The illuminated button is then activated initiating a dialing operation that retrieves the voice mail. Battery charge is measured in a dual mode analog and digital cellular phone according to the various digital and analog modes presently performed. The different measurement values are averaged to provide a more accurate calculation of the amount of charge remaining in the battery supply.

13 Claims, 7 Drawing Sheets

FIG.7 a # ANNUNCIATOR AND BATTERY SUPPLY MEASUREMENT SYSTEM FOR CELLULAR TELEPHONES

BACKGROUND OF THE INVENTION

This invention relates generally to cellular telephones and more particularly to a phone annunciation and battery measurement system.

Cellular telephones are typically used when an operator is performing other duties, such as driving a car. However, conducting various phone operations, such as dialing, require the phone operator to remember and select a long sequence of number on the phone keypad. Thus, the phone operator is distracted from other activities while dialing the phone number.

Cellular phones also annunciate different conditions to the phone operator. For example, a light emitting diode (LED) is activated when the phone battery is below a given charge level. These annunciators use additional space on the phone and add additional mechanical components which increase manufacturing costs.

The phone battery must be monitored to ensure successful message communication. For example, a phone conversation may be unintentionally cut short if the phone battery does not have sufficient charge. If notified early enough, the phone battery can be recharged or replaced before the phone becomes inoperable.

Digital Cellular telephones transmit and receive digital messages during various time slots. During the data transmit time slot, the phone's power amplifier (PA) is temporarily activated creating a large current drain in the battery. After the phone transmission is completed, the current drain on the battery is reduced.

Because the battery load continuously fluctuates, battery charge is difficult to measure accurately. If the battery supply voltage is measured during a high load condition, for example, during a voice transmission, the battery will appear to have a low charge. However, if measured during a low load condition, for example, before or after a message transmission or reception, the battery supply may appear to have a high charge. Thus, simply measuring the phone battery periodically does not accurately determine the remaining charge in a power supply used in a cellular phone.

Accordingly, a need remains for annunciating cellular phone conditions and initiating corresponding phone operations in a more efficient and cost effective manner while more accurately measuring charge in a cellular phone battery.

SUMMARY OF THE INVENTION

A cellular phone both annunciates and retrieves stored mail messages using a single keypad button. A cellular basestation transmits messages to the cellular phone indicating that voice mail is ready for retrieval. An LED is located on a front face of the cellular phone underneath a translucent keypad mail button. The LED is activated when a voice mail ready message is received by the cellular phone. The phone number of the voice mail system is stored in memory and is addressed when the illuminated button is depressed. The illuminated button is then depressed to initiate a dialing operation that retrieves the voice mail.

The illuminated button directs the phone operator to the correct button for initiating retrieval of voice mail messages. Thus, the voice mail system is easier to operate. The phone operator is also required to press fewer buttons to retrieve voice mail. The illuminated button comprises one of the standard buttons on the phone keypad. Thus, voice annunciation is performed using a minimal number of additional phone components.

Additional phone conditions are annunciated via other buttons on the standard phone keypad. For example, a battery charge indicator light is located underneath a translucent asterisk button. The battery charge indicator light is activated when the battery voltage drops below a predetermined value. The asterisk button is then illuminated identifying a low battery condition to the phone operator.

According to another aspect of the invention, the phone battery voltage is measured for a dual mode analog/digital cellular phone. A battery measurement system measures battery voltage differently according to the various digital and analog modes of the dual mode phone. The different measurement values are averaged to filter out large fluctuations in the battery voltage that occur during different phone operations.

The battery voltage is measured asynchronously at different periodic rates when the phone operates in either an analog mode or in a standby mode. However, when the phone operates in a digital mode, the battery is measured at the end of each transmission time slot. Each measured value is averaged and then gradated into different power levels. The phone then performs annunciation and shut down operations according to the calculated power levels. The phone system also adjusts the measured battery voltage to account for variations in component values.

The foregoing and other objects, features and advantages of the invention will become more readily apparent from the following detailed description of a preferred embodiment of the invention which proceeds with reference to the accompanying drawings.

DETAILED DESCRIPTION

Annunciator Combined with Translucent Button on Cellular Phone Keypad

Figure 1:
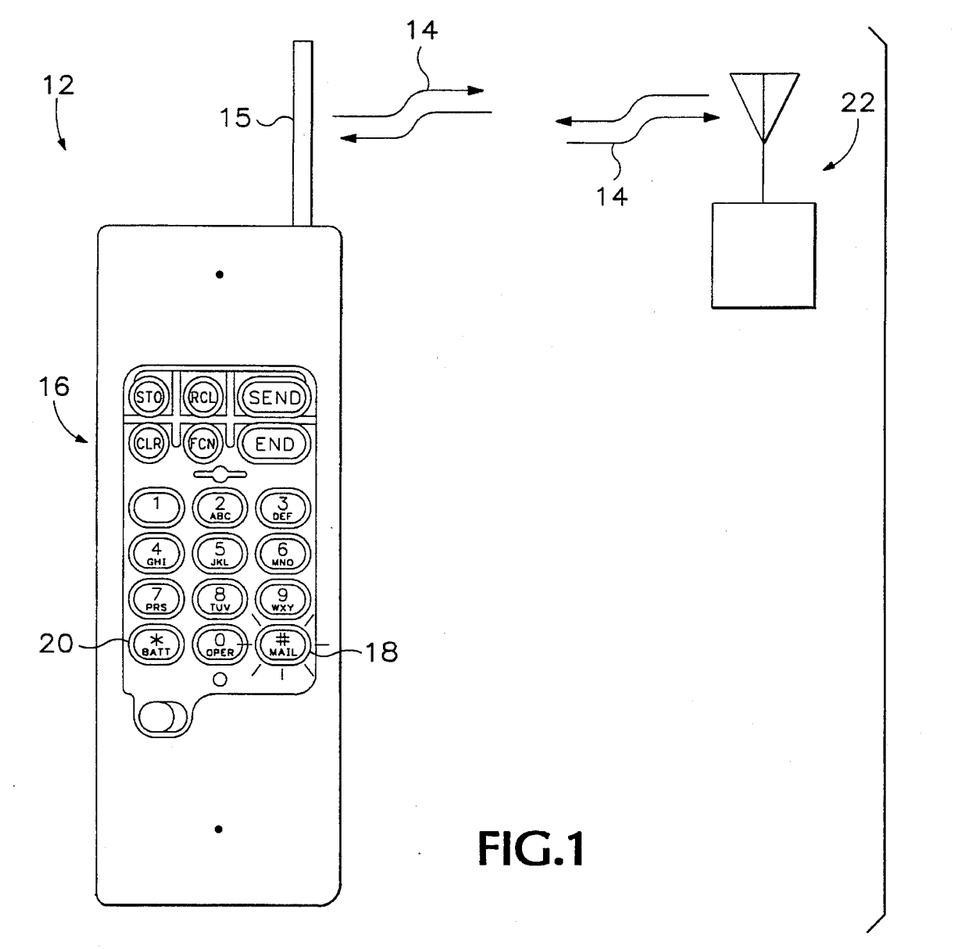
FIG. 1 is a schematic diagram of a cellular phone according to the invention shown receiving messages from a cellular basestation.

FIG. 1 is a schematic diagram of a cellular phone 12 according to the invention receiving messages and voice signals 14 from a cellular basestation 22. The cellular basestation 22 transmits and receives messages and voice signals to cellular phone 12 either in a digital mode or in an analog mode. The communication protocol for transmitting digital and analog messages from a cellular basestation to cellular phones is explained in the IS-54B standard published by the Telecommunications Industry Association, 2001 Pennsylvania Avenue N.W., Washington, D.C. 20006, and is herein incorporated by reference.

The phone 12 includes a standard keypad 16 that includes numbers 0–9, asterisk "*", and pound "#" buttons. Additional cellular phone buttons such as "send" and "end" are located above the standard keypad 16. The asterisk button 20 and the pound button 18 are each made from a translucent material that covers an associated LED. Each button is illuminated when the associated LED is activated.

Primary messages are transmitted from the cellular basestation 22 to the cellular phone 12 on a Fast Associated Control Channel (FACCH). The FACCH channel contains a field that indicates whether voice mail directed to the cellular phone 12 has been received by a local phone service. The protocol and format for transmitting and receiving the FACCH voice mail message is contained in the IS-54B standard and is, therefore, not described in detail.

When a message waiting message is received by phone 12, the mail button (pound button) 18 is illuminated. By pressing the mail button 18 and then the send button, the voice mail is automatically retrieved. The LED behind the mail button 18 is then shut-off. In a similar manner, when the phone battery drops below a preselected voltage level, battery button (asterisk) 20 is illuminated.

Figure 2:
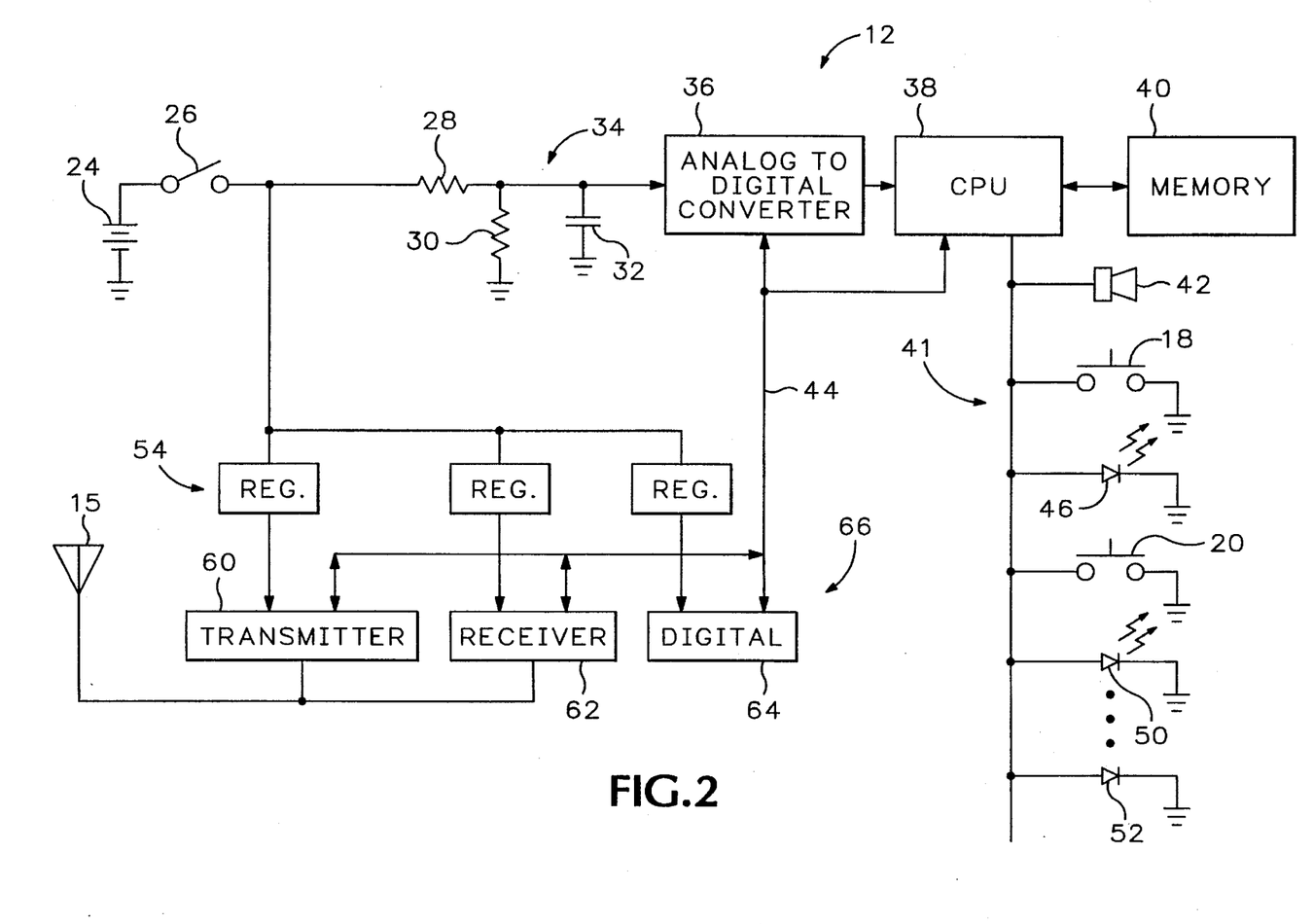
FIG. 2 is a schematic diagram of an electrical circuit for the cellular phone shown in FIG. 1.

FIG. 2 is a schematic diagram of a circuit for the cellular phone 12 shown in FIG. 1. A phone battery 24 is coupled through a switch 26 to an analog-to-digital converter (ADC) 36. A central processing unit (CPU) 38 is coupled between ADC 36 and a memory 40. The switch 26 is typically a metal oxide semiconductor (MOS) field effect transistor (FET) but can represent any switch used for connecting and disconnecting battery 24. A filter/voltage divider circuit 34 is coupled between switch 26 and ADC 36. The filter/voltage divider circuit 34 comprises resistors 28 and 30 and capacitor 32.

Voltage regulators 54 are coupled between battery 24 and various phone circuits 66. The phone circuits 66 comprise digital circuitry 64 which includes CPU 38 and memory 40. CPU 38 and memory 40 are shown separately for clarity. The phone circuits 66 further include a receiver circuit 62 and a transmitter circuit 60. The voltage regulators 54 provide individual reference voltages to the corresponding phone circuits 66. A control and data bus 44 is coupled between the various phone circuits 66, ADC 36, and CPU 38.

An annunciation system 41 is coupled to the CPU 38 and includes a speaker 42 and various LED's 46, 50 and 52. Push buttons on the phone keypad 16 (FIG. 1) are located next to associated LEDs. For example, the mail button 18 is located above LED 46 and the battery button 20 is located above LED 50.

Figure 3:
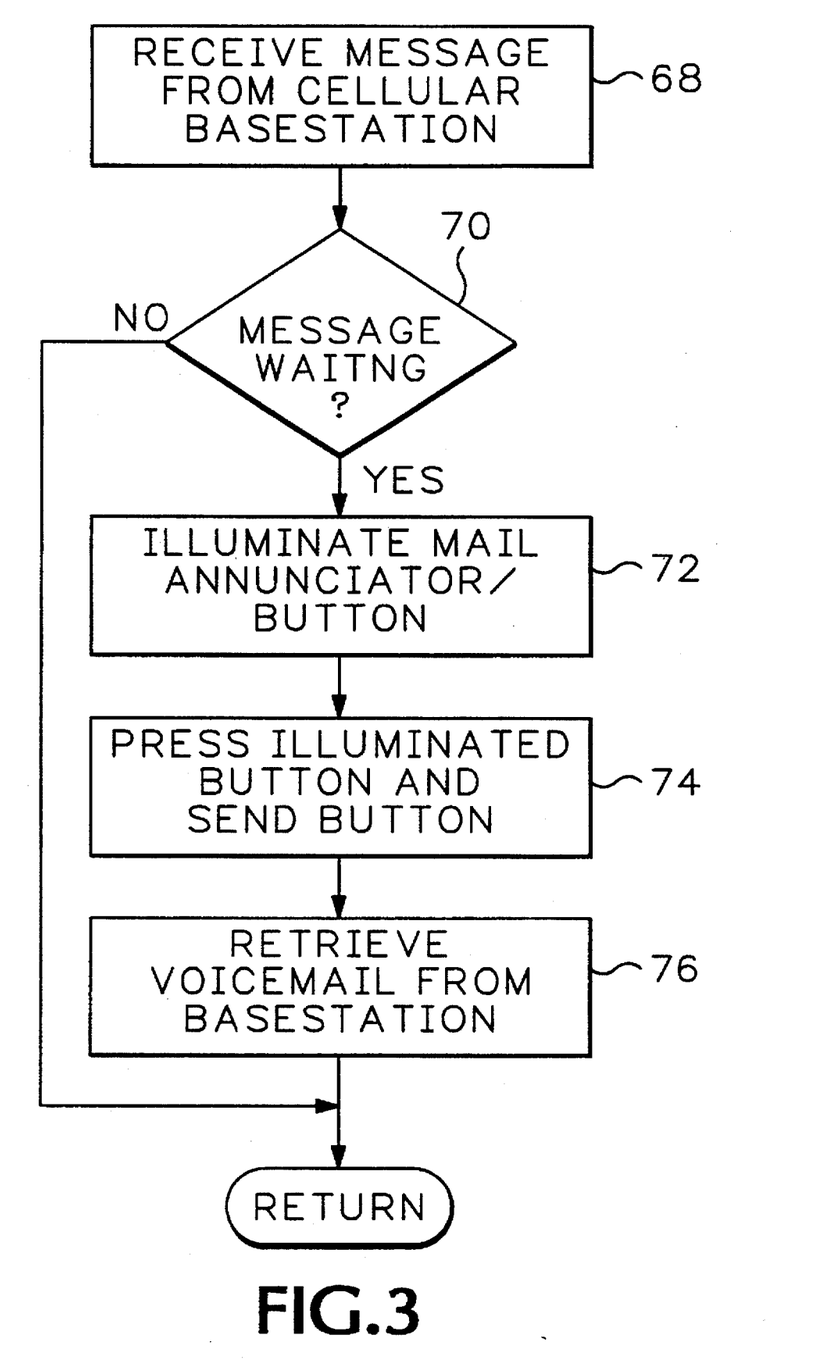
FIG. 3 is a flow diagram showing a method for annunciating and retrieving voice mail with the phone shown in FIG. 1.

FIG. 3 is a flow diagram showing a method for annunciating and retrieving voice mail with the phone shown in FIG. 1. A FACCH message is transmitted from cellular basestation 22 to cellular phone 12 (FIG. 1) in step 68. Step 70 reads the FACCH message to determine if voice mail has been left for phone 12. If the message indicates that no voice mail message has been left, the phone returns to step 68 and monitors for the next FACCH message.

If a voice mail message has been left, LED 46 is activated underneath button 18 (FIG. 2) in step 72. To retrieve the voice mail, illuminated button 18 is depressed in step 74 automatically addressing a prestored phone number in memory 40. The phone number when dialed, contacts the telephone company voice mail system presently used by the cellular phone operator. The send button is depressed dialing the stored phone number. The voice mail messages are then retrieved from the voice mail system in step 76 and LED 46 turned off. An additional annunciator signal can be generated from speaker 42 when the voice mail message is received by phone 12.

Referring back to FIGS. 1 and 2, the mail button 18 and the battery button 20 are made of a translucent material that passes light from the LED's 46 and 50, respectively. Thus, both buttons 18 and 20 perform dual operations as asterisk and pound buttons and as annunciators. The battery button 20, when illuminated, indicates a low phone battery as will be described in detail below.

If depressed during illumination, mail button 18 provides a third function that automatically addresses the pre-stored phone number of the voice mail system. Because a voice mail message is annunciated visually, the phone operator can be notified of a voice mail message while talking on the phone.

The illuminated button also serves as the enable switch for accessing the voice mail system. Therefore, the phone operator is not only notified of voice mail but is also directed to the appropriate keypad button that should be depressed for accessing the voice mail. Thus, the phone voice mail system is easier to operate. By using existing buttons on the phone keypad, less space and fewer components are used for annunciation.

Battery Measurement

A dual mode analog/digital phone is known that varies the output power of a power amplifier according to different pre-stored output power levels determined by the cellular basestation. Referring back to FIG. 2, the voltage of battery supply 24 changes according to the type of operation performed by phone 12. For example, the power amplifier in the transmitter circuit 60 (not shown) draws a current when the phone is transmitting either a digital or analog message. Alternatively, the phone circuitry 66 uses very little power when operating in a standby mode where no messages are being received or transmitted.

The system in FIG. 2, measures battery 24 according to the digital, analog or standby mode of the phone. A filtering method is then performed in CPU 38 to normalize measured voltage fluctuations caused during transitions between the various phone transmit and receive modes. As a result, the battery measurement system accurately determines the charge remaining in the phone battery.

Figure 4:
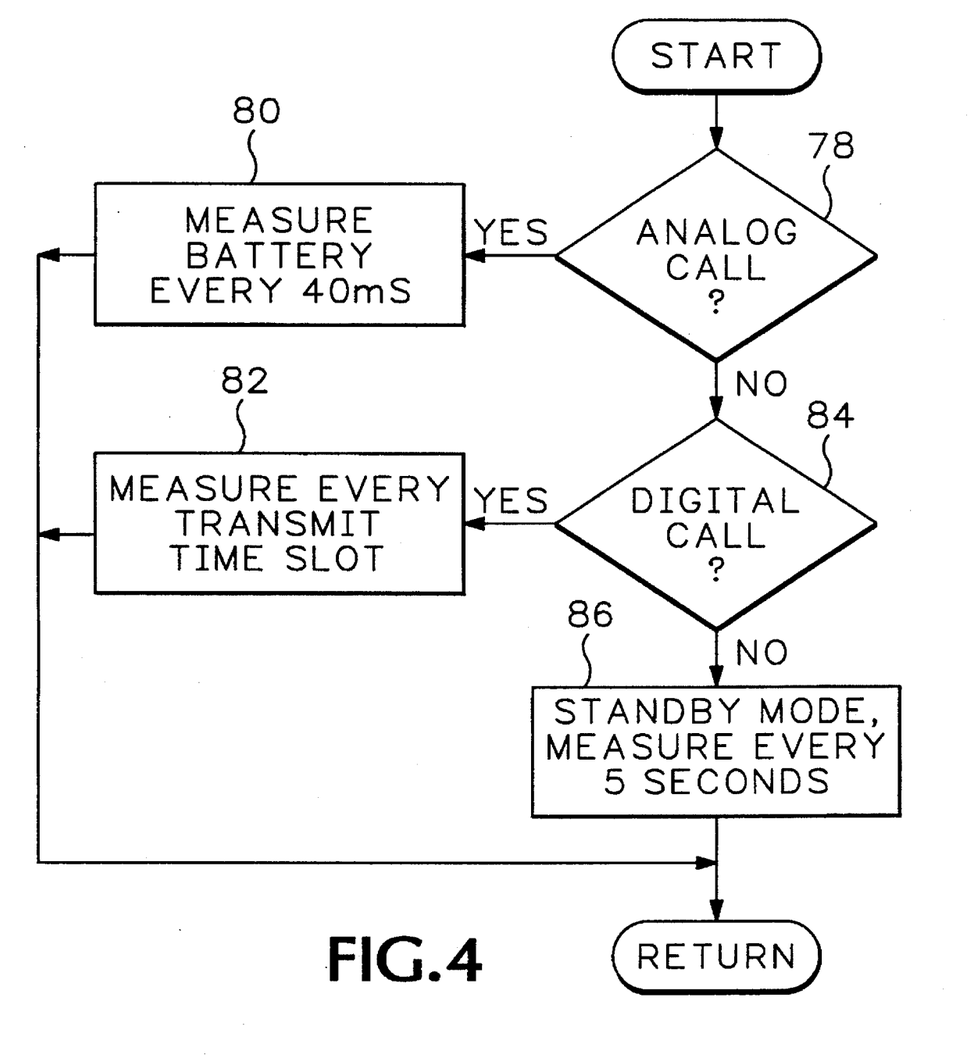
FIG. 4 is a flow diagram showing a method for measuring the cellular phone battery voltage according to another aspect of the invention.

FIG. 4 is a flow diagram showing the method for measuring battery 24 in a dual mode cellular phone. If the phone is performing an analog call in step 78, battery 24 is measured at a first periodic rate of once every 40 milliseconds in step 80. The periodic rate is asynchronous with the different transmit and receive operations performed in the analog mode.

When the phone is performing a digital call in step 84, battery 24 is measured during the latter portion of each transmit time slot in step 82. Voltage oscillations are created when the transmitter's power amplifier is instantaneously turned on and off. By measuring the battery voltage at the end of each transmit time slot, oscillations in the battery voltage have time to settle before an actual voltage measurement it taken. The different transmit and receive time slots for digital voice transmission are described in the IS-54B standard and are, therefore, not described in detail.

If the phone is in a standby mode, step 86 measures the battery 24 at a second periodic rate of once every 5 seconds. The standby mode is defined as any mode where the phone is not transmitting or receiving voice messages. Battery 24 remains in a relatively stable charge condition when the phone is in a standby mode. Thus, the time between subsequent battery measurements can be longer. However, during an analog call or a digital call, battery measurements are taken more often to more closely monitor the remaining battery charge in battery 24.

Figure 5:
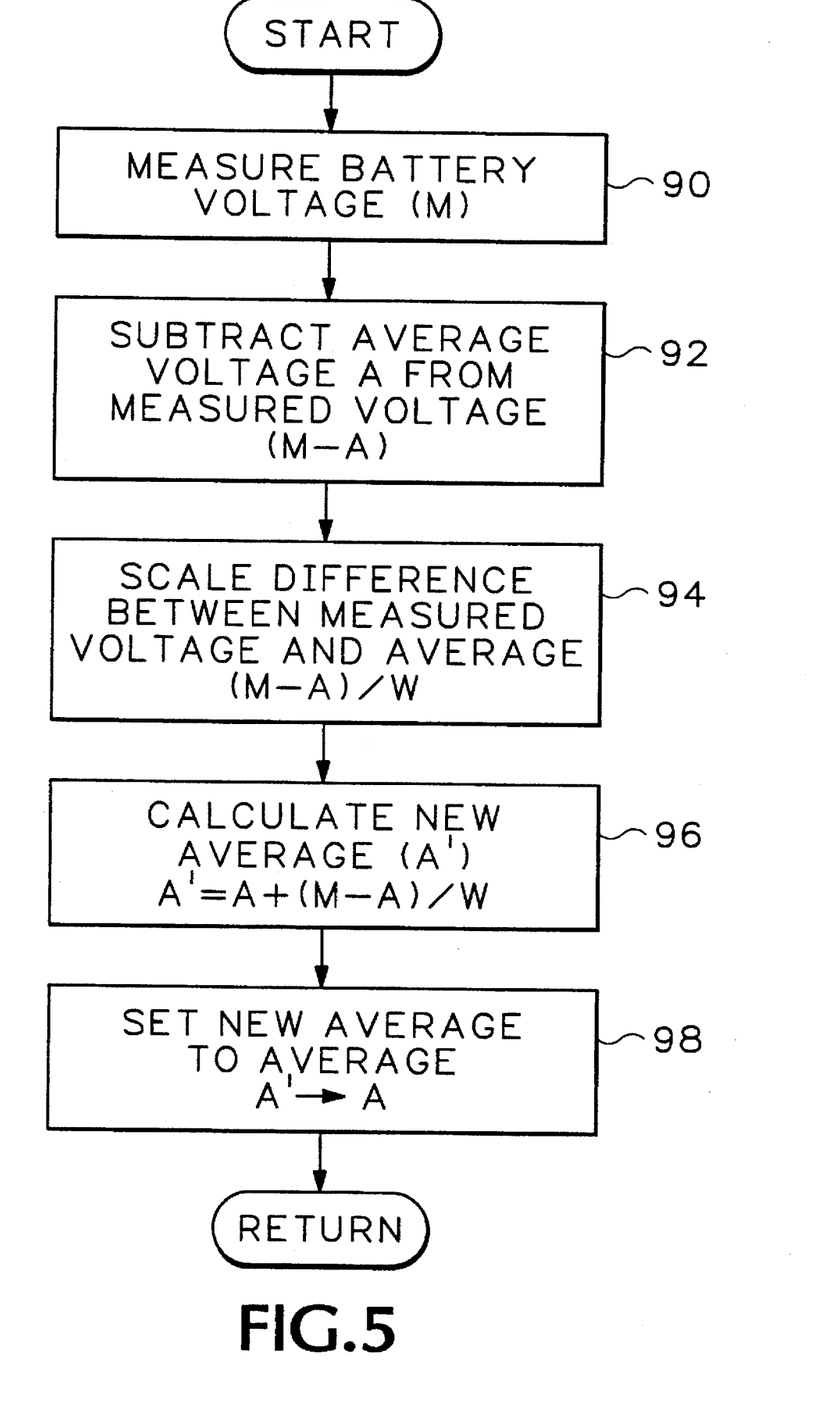
FIG. 5 is a flow diagram showing a method for averaging the battery voltage measured in FIG. 4.

FIG. 5 is a flow diagram showing a method for averaging the battery voltage measurements. The battery voltage "M" is measured according to the phone operating mode in step 90 as described above.

The measurement value M is subtracted by an average value "A" calculated from previous battery measurements in step 92. The difference (M−A) is scaled by a predetermined value "W" in step 94. In one embodiment of the invention, the value of "W" is equal to eight. A new average "A'" is calculated in step 96 by adding the scaled difference to the previous average value (A'=A+(M−A)/W). The new calculated average value A' is then set as the average A in step 98 (A'→>A). The CPU 38 (FIG. 2) then returns to step 90 for the next battery measurement.

By averaging the measured battery voltages, changes in the measured battery voltage due to instantaneous activation of circuitry, noise, etc., is filtered from the final calculated value.

Figure 6:
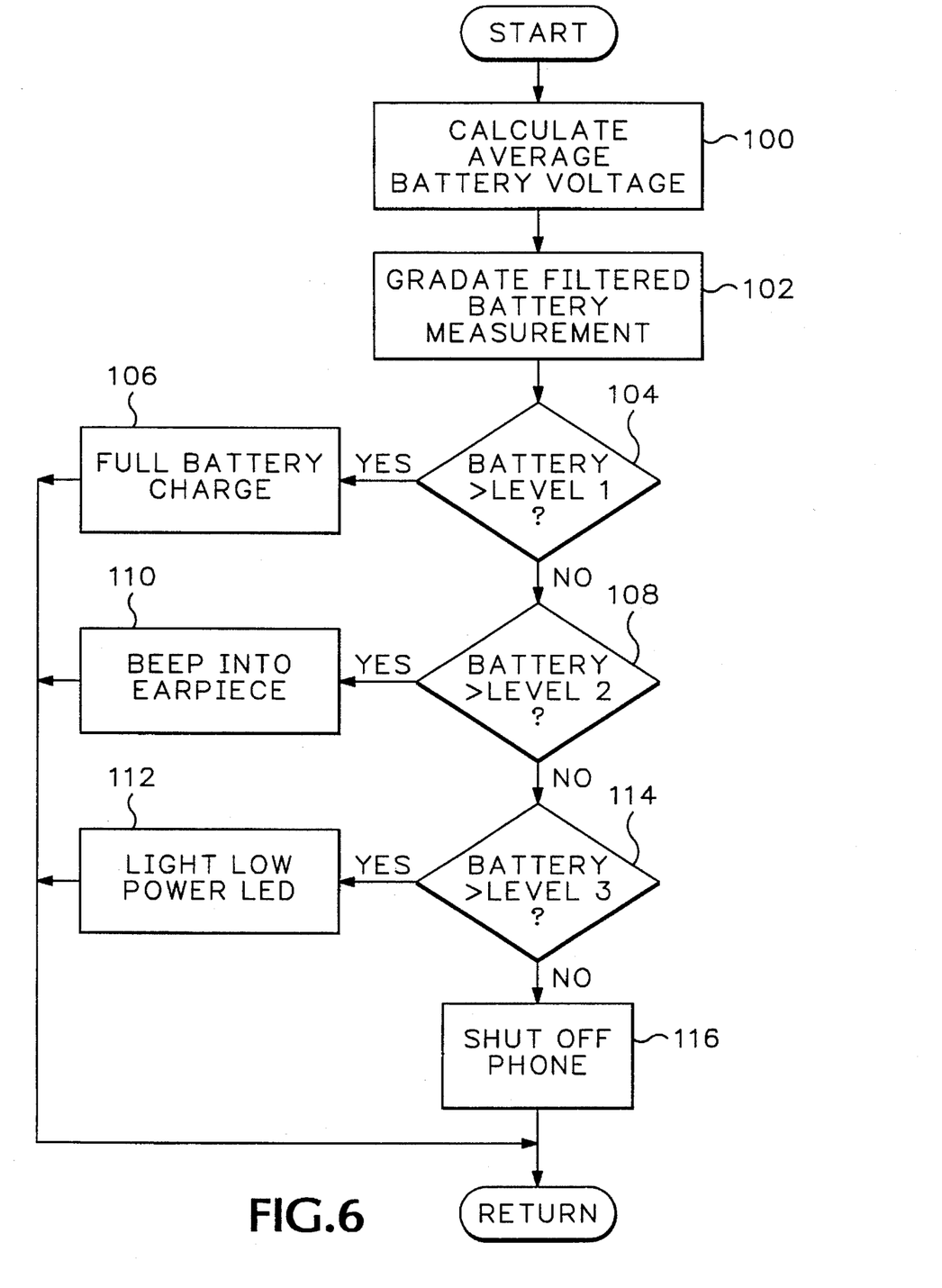
FIG. 6 is a flow diagram showing various operations performed by the cellular phone according to the battery voltage measured in FIG. 5.

FIG. 6 is a flow diagram that describes the various phone operations performed according to the battery voltage calculated in FIG. 5. Step 100 calculates the average battery voltage as previously described in FIG. 5. The average battery voltage "A" is graduated into one of four different power levels is step 102.

The different power levels are calculated from previous battery and phone characterizations and then stored in memory 40 (FIG. 2). Each pre-stored power level is associated with a charge condition in battery 24 (FIG. 2). For example, the power levels are typically associated with different amounts of operating time that the battery can continue to transmit and receive voice messages.

Step 104 checks for an average battery voltage "A" above a first battery power level. If "A" is greater than the first power level, the CPU 38 in step 106 regards the battery as having a full charge and returns to step 100 for the next measurement. In step 108, if "A" is below the first battery power level, but above the second battery power level, step 110 activates speaker 42 (FIG. 2). Speaker 42 generates a beep in the phone's ear piece aurally warning the phone operator that the battery is in a low charge condition.

If "A" is between the second and third battery power levels, LED 50.(FIG. 2) is activated in step 112. The LED 50 visually annunciates a low battery level to the phone operator. If "A" is below the third battery power level, the battery does not have sufficient charge to transmit. The phone is then shut off in step 116. The CPU 38 keeps the phone off until the battery voltage rises above at least the third power level.

Resistors 28 and 30 in FIG. 2 comprise a voltage divider. Each resistor typically has a tolerance of 5 percent. If the resistor values change between different phones, the average voltage calculations measured in FIG. 5 may be inaccurate. Therefore, the CPU 38 automatically adjusts the measured power supply voltage to correct for variances in resistor values.

Figure 7:
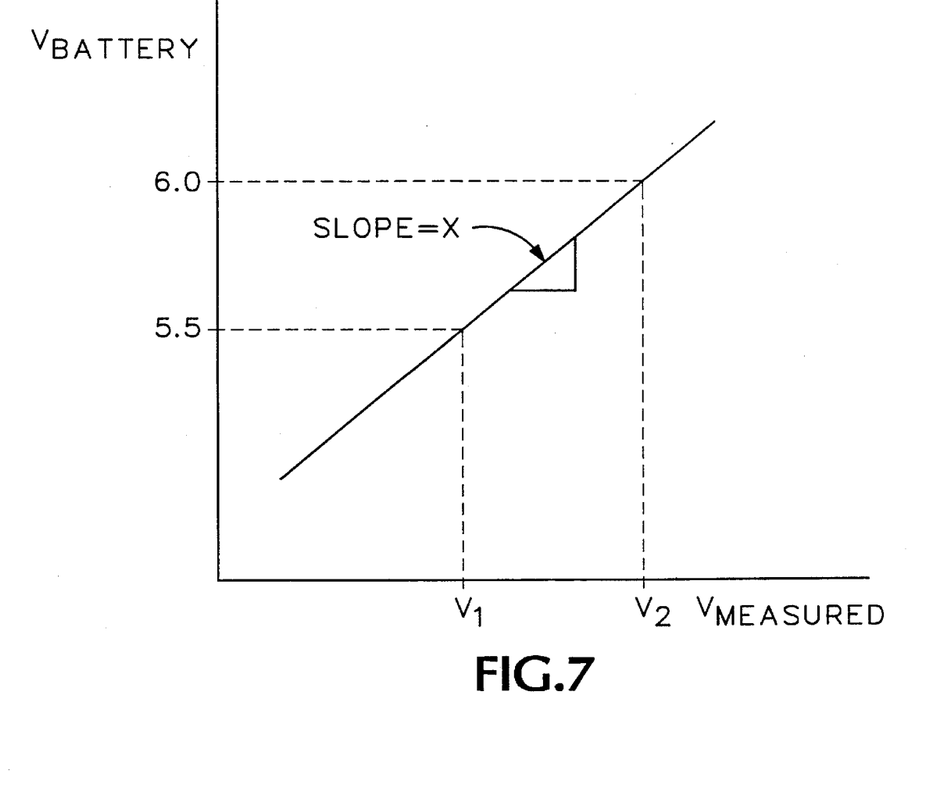
FIG. 7 is a graph showing how the battery voltage is adjusted to correct for variations in resistor values.

Referring to FIG. 7, voltage values $V_1$ and $V_2$ are measured at the ADC 36 with a test system generating voltages of 5.5 volts and 6.0 volts, respectively. The slope X between the two measured battery voltages is then calculated and stored along with $V_1$ and $V_2$ in memory 40.

During operation, CPU 38 reads a measured value "M" for the battery 24 from ADC 36. The measured value "M" is subtracted by the battery voltage at 5.5 volts ($V_1$). The difference ΔV is multiplied by the slope X to determine the actual voltage of phone battery 24. Thus, the measured voltage is individually adjusted in each phone system to correct for variations in resistor values.

Having described and illustrated the principles of the invention in a preferred embodiment thereof, it should be apparent that the invention can be modified in arrangement and detail without departing from such principles. I claim all modifications and variation coming within the spirit and scope of the following claims.

We claim:

1. A method for measuring battery voltage in a cellular phone having an analog mode, a distal mode, and a standby mode, comprising:

periodically measuring the battery voltage at a first rate when the phone is operating in the analog mode;

periodically measuring the battery voltage at a second rate slower than the first rate when the phone is operating in the standby mode;

transmitting and receiving digitally encoded messages during selected time slots when the phone is operating in the digital mode;

periodically measuring the battery voltage only during the selected time slots when the phone is operating in the digital mode;

calculating an average voltage for each measured battery voltage;

repeatedly measuring a new battery voltage according to the operating mode of the phone; and adjusting the average voltage according to the new phone battery voltage.

2. A method according to claim 1 wherein the step of repeatedly measuring the new phone battery voltage is periodic and asynchronous with phone transmission and receiving operations.

3. A method according to claim 1 wherein the step of adjusting the average voltage comprises the following steps:

subtracting the average voltage from each new battery voltage;

weighting the difference between each new battery voltage and the average voltage;

adding the weighted difference to the average voltage thereby creating a new average; and setting the new average voltage to the average voltage.

4. A method according to claim 3 including gradating the new average voltage into various battery power levels, each battery power level directing a different alarm annunciation operation.

5. A method according to claim 4 wherein the new voltage is gradated into at least three stored battery power levels, a new average voltage between the first and second battery power levels generating a phone audio annunciation operation, a new average voltage between the second and third battery power levels generating a phone illumination annunciation operation, and a new average voltage below the third level causing the phone to shut off.

6. A method according to claim 1 including adjusting the new battery voltage to correct for variations in tolerances in a given set of phone components.

7. A method according to claim 6 wherein adjusting the new battery voltage comprises the following steps:

measuring first and second known phone test voltages;

determining the slope between the first and second test voltages;

storing the first and second test voltages and the slope;

measuring the phone battery voltage;

subtracting the measured phone battery voltage from the stored first measured test voltage generating a delta value;

applying the stored slope to the delta value generating a correction value; and applying the correction value to each measured battery voltage.

8. A method according to claim 1 wherein measuring the battery voltage at the first rate comprises measuring the battery voltage about every 40 milliseconds; and measuring the battery voltage at the second rate comprises measuring the battery voltage about every 5 seconds.

9. A method according to claim 1 wherein the battery voltage is measured during a latter portion of each one of the selected time slots while the phone operates in the digital mode.

10. A method according to claim 7 wherein the first one of the test voltages is about 5.5 Volts and the second one of the test voltages is about 6.0 Volts.

11. A method for measuring a battery in a cellular phone, comprising:

measuring a predetermined first test voltage;

measuring a predetermined second test voltage;

determining a slope between the first test voltage and the second test voltage;

storing the first and second test voltage and the slope;

periodically measuring the battery voltage;

subtracting the stored first measured test voltage from each periodically measured battery voltage thereby generating delta values;

applying the slope to each of the delta values generating correction values associated with each measured battery voltage; and applying the associated correction value to each measured battery voltage.

12. A method according to claim 11 including the following steps:

calculating an average voltage for the periodically measured battery voltage;

measuring a new battery voltage;

subtracting the average voltage from the new battery voltage;

weighting the subtracted difference between the new battery voltage and the average voltage;

adding the weighted difference to the average voltage creating a new average voltage; and setting the new average voltage to the average voltage.

13. A method for measuring battery voltage in a digital cellular phone, comprising:

transmitting and receiving digitally encoded messages during selected time slots;

measuring battery voltages only during a latter portion of each of said time slots;

calculating an average voltage for the measured battery voltages;

measuring a new battery voltage; and adjusting the new phone battery voltage according to the average voltage.

* * * * *